April 16, 1940.  N. M. LAWLESS  2,197,413
CRANKSHAFT
Filed July 25, 1939

Inventor
Nathan M. Lawless
By Paul O. Pippel
Atty.

Patented Apr. 16, 1940

2,197,413

UNITED STATES PATENT OFFICE 2,197,413

CRANKSHAFT

Nathan M. Lawless, Moline, Ill., assignor to International Harvester Company, a corporation of New Jersey Application July 25, 1939, Serial No. 286,355

7 Claims. (Cl. 74—597)

This invention relates to a crankshaft. More specifically, it relates to a crankshaft of welded construction suitable for operating the straw rack of a thresher.

It is desirable to make crankshafts of a light fabricated structure wherever possible, as the manufacture of a crankshaft from a single piece of metal is expensive.

An object of the present invention is to provide an improved crankshaft.

Another object is the provision of a crankshaft formed of a plurality of parts.

A further object is to provide a crankshaft of a plurality of parts welded together.

According to the present invention, cranks and pins are fabricated of individual parts, and they are welded together with the pins being embraced by notches in the ends of the cranks.

In the drawing—

The crankshaft of the present invention comprises a series of short pins or shafts 10 connected to one another by a series of cranks 11. Each pin is of circular section so as to form a bearing for some member connected thereto. In the present instance, the pins are to be connected to straw racks of a thresher, which are not shown. It will be understood, of course, that the crankshaft is adapted for other uses.

Figure 1:
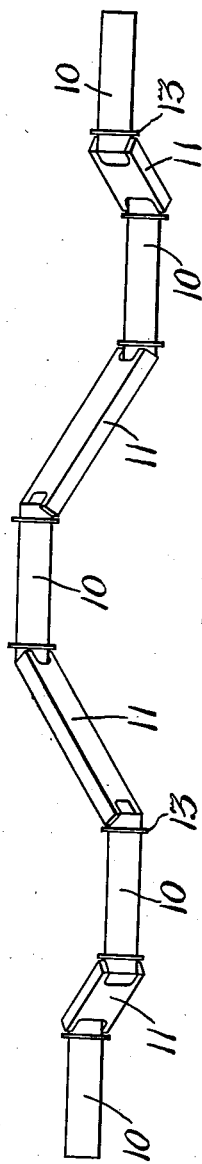
Figure 1 is a side view of the crankshaft of the present invention.
Figure 2:
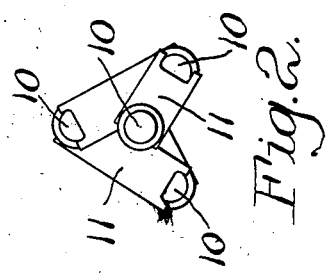
Figure 2 is an end view of the same.
Figure 4:
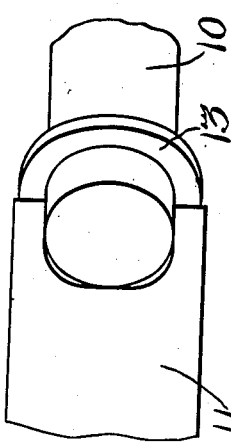
Figure 4 is a view taken along the line 4—4 of Figure 3.
Figure 5:
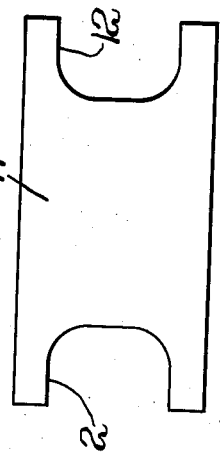
Figure 5 is a detail view of a crank.
Figure 3:
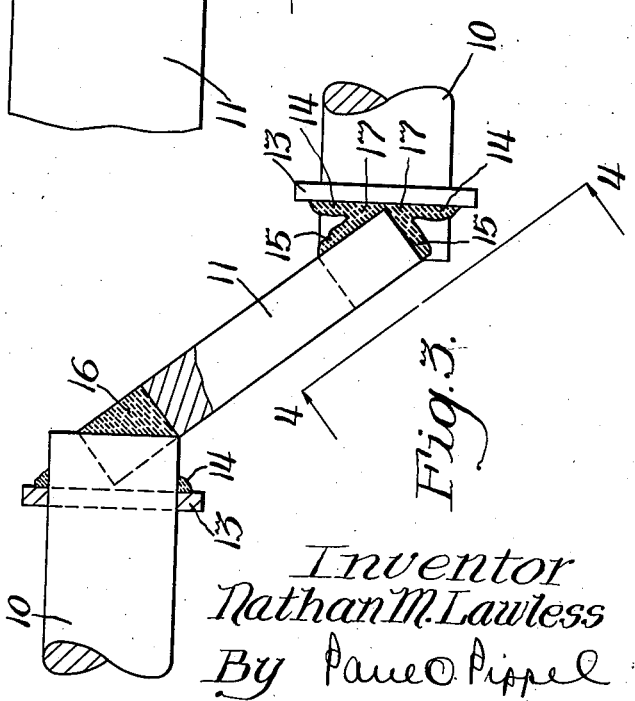
Figure 3 is a view partially in section, showing how the parts of the crankshaft are welded together.

As shown in Figures 3 and 5, each crank is in the form of a flat bar, generally rectangular in section and substantially larger in one dimension than in the other, and is provided with a notch 12 in each end to a depth somewhat larger than half its width, which is substantially equal to the diameter of the pin 10. The notch has rounded corners. The wall of the notch is perpendicular to the side faces of the crank. The ring 13 is placed over each end of the pin, and the end of the pin is made to fit within the notch 12 of the crank 11. Then weld metal is deposited on the parts so as to weld the ring 13 and the pin 10, as at 14, and the pin 10 and crank 11, as at 15 and 16. It will be observed in Figure 3 that, because the crank extends from the pin at an obtuse angle and the notch wall is at substantially right angles to the faces of the crank, the pin occupies only part of the notch and leaves a pocket for the weld metal 16. Similarly, pockets are provided, as at 17, adjacent the points where the crank 11 is closest to the ring 30.

As stated above, the depth of each notch 12 is somewhat more than half its width, so that the notch approximates the shape of half of an ellipse. In order that the crank 11, extending at an obtuse angle from the pin 10, may contact all parts of the pin embraced, the notch should theoretically be of elliptical shape. Actually, any shape notch which will embrace the pin is satisfactory, for the weld metal will fill up any space between the pin and the notch. It is obvious that the width of the crank must be greater than the diameter of the pin. The crank is made sufficiently thick so that the torque strength is equal to that of the pin.

It will be apparent from the foregoing description that a novel crankshaft has been provided, which is cheap and easy to manufacture and yet possesses the requisite strength. The particular shape of the parts and the way in which they are assembled provide natural pockets for weld metal which holds the parts together.

The intention is to limit the invention only within the terms of the appended claims.

What is claimed is:

1. In combination, a pin, and a crank having a notch in one end embracing an end of the pin and being welded to the pin.

2. In combination, a crank having a notch in one end, a pin partially embraced by the notch in the crank and extending obliquely therefrom so as to leave a space in the notch, and weld material positioned in the space in the notch and joining the pin and the crank.

3. In combination, a crank having a notch in one end, a pin partially embraced by the notch in the crank and extending obliquely therefrom so as to leave a space in the notch, a ring surrounding the pin at a point adjacent the notch in the crank, weld material positioned in the space in the notch and joining the pin and crank, and weld material contacting side surfaces of the pin, the ring, and the end portion of the crank and joining the pin to the ring and to the crank.

4. In combination, a pin of round section, a crank of rectangular section of which one dimension is greater than the pin diameter and the other dimension is less, said crank having a notch in the end embracing the end of the pin, and weld metal in the notch joining the pin and the crank.

5. In combination, a pin of round section, a crank having approximately the same torque strength as the pin and being of rectangular section of which the dimensions are respectively greater and less than the pin diameter, the crank having a notch in the end embracing the end of the pin, the pin extending obliquely from the crank and thereby leaving a space in the notch, and weld metal in the space of the notch joining the pin and the crank.

6. In combination, a pin of round section, a crank of rectangular section of which the dimensions are respectively greater and less than the pin diameter, the crank having a notch in the end embracing the end of the pin, a ring surrounding the end of the pin adjacent the crank, and weld metal joining the ring, pin, and crank.

7. In combination, a pin of round section, a crank having approximately the same torque strength as the pin and being of rectangular section of which the dimensions are respectively greater and less than the pin diameter, the crank having a notch in the end embracing the end of the pin, the pin extending obliquely from the crank and thereby leaving a space in the notch, a ring surrounding the end of the pin adjacent the crank, and weld metal in the space in the notch joining the crank and pin and also between the pin and ring to join the same.

NATHAN M. LAWLESS.